US010393951B2

(12) United States Patent
Zhou

(10) Patent No.: US 10,393,951 B2
(45) Date of Patent: Aug. 27, 2019

(54) BACKLIGHT MODULE AND DISPLAY DEVICE

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventor: Gege Zhou, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 255 days.

(21) Appl. No.: 14/901,043

(22) PCT Filed: Jul. 14, 2015

(86) PCT No.: PCT/CN2015/083947
§ 371 (c)(1),
(2) Date: Dec. 27, 2015

(87) PCT Pub. No.: WO2016/206142
PCT Pub. Date: Dec. 29, 2016

(65) Prior Publication Data

US 2017/0146726 A1 May 25, 2017

(30) Foreign Application Priority Data

Jun. 26, 2015 (CN) .......................... 2015 1 0361769

(51) Int. Cl.
*F21V 8/00* (2006.01)

(52) U.S. Cl.
CPC ......... *G02B 6/0088* (2013.01); *G02B 6/0026* (2013.01); *G02B 6/0055* (2013.01);
(Continued)

(58) Field of Classification Search
CPC .. G02B 6/0088; G02B 6/0026; G02B 6/0055; G02B 6/0068; G02B 6/002; G02B 6/0065
(Continued)

(56) References Cited

U.S. PATENT DOCUMENTS

2011/0141769 A1 6/2011 Lee et al.
2012/0050649 A1 3/2012 Yeo
(Continued)

FOREIGN PATENT DOCUMENTS

CN 2659982 Y 12/2004
CN 1862024 A 11/2006
(Continued)

*Primary Examiner* — Anh T Mai
*Assistant Examiner* — Jessica M Apenteng
(74) *Attorney, Agent, or Firm* — Andrew C. Cheng

(57) ABSTRACT

The present invention provides a backlight module, wherein the backlight module comprises a glue frame, a backlight source, a light guide plate, a quantum tube and an optical thin film, and the light guide plate comprises an incident surface and an illuminating surface, and the backlight source comprises a substrate and a plurality of lamp sources on the substrate aligned in a straight line, and the quantum tube comprises a mainbody and two bending sections at two ends of the mainbody, and the glue frame is arranged to surround the light guide plate and periphery of the optical thin film, and the quantum tube is installed on the substrate and arranged to be parallel with the plurality of lamp sources, and bending sections at the two ends of the mainbody are located at outer sides of the lamp sources at two ends of the plurality of the lamp sources.

18 Claims, 2 Drawing Sheets

(52) U.S. Cl.
CPC ............ *G02B 6/0068* (2013.01); *G02B 6/002* (2013.01); *G02B 6/0065* (2013.01)

(58) Field of Classification Search
USPC .......................................................... 362/606
See application file for complete search history.

(56) References Cited

U.S. PATENT DOCUMENTS

| | | | | |
|---|---|---|---|---|
| 2012/0155115 | A1* | 6/2012 | Jang | G02F 1/133603 362/608 |
| 2013/0009180 | A1* | 1/2013 | Kim | G02B 6/0026 257/89 |
| 2014/0036536 | A1 | 2/2014 | Gettemy et al. | |
| 2015/0234111 | A1* | 8/2015 | Lee | G02B 6/0023 362/608 |

FOREIGN PATENT DOCUMENTS

| | | | |
|---|---|---|---|
| CN | 101625001 | A | 1/2010 |
| CN | 201780291 | U | 3/2011 |
| CN | 102297369 | A | 12/2011 |
| CN | 102544314 | A | 7/2012 |
| CN | 103775923 | A | 5/2014 |
| CN | 203733016 | U | 7/2014 |
| CN | 203980010 | U | 12/2014 |
| CN | 204265811 | U | 4/2015 |
| CN | 104595199 | A | 5/2015 |
| CN | 104613384 | A | 5/2015 |
| CN | 104633548 | A | 5/2015 |
| CN | 204419604 | U | 6/2015 |
| CN | 204783703 | U | 11/2015 |
| CN | 204945153 | U | 1/2016 |
| JP | 58-110894 | A | 7/1983 |
| JP | 4128062 | B2 | 7/2008 |
| KR | 20110080088 | A | 7/2011 |
| WO | 2008/047159 | A1 | 4/2008 |

* cited by examiner

BACKLIGHT MODULE AND DISPLAY DEVICE

CROSS REFERENCE

This application claims the priority of Chinese Patent Application No. 201510361769.0, entitled "Backlight module and display device", filed on Jun. 26, 2015, the disclosure of which is incorporated herein by reference in its entirety.

FIELD OF THE INVENTION

The present invention relates to a liquid crystal display field, and more particularly to a backlight module and a display device.

BACKGROUND OF THE INVENTION

The liquid crystal display device is the main stream flat panel display technology in the present market. All displays need backlight to be the light source for illuminating the liquid crystal display device. The traditional backlight module comprises a backlight source consisted of LEDs, and as the light of the backlight module passes through the backlight module, the light source is converted into a surface light source to for illumination, and after the lighting uniformity of the diffuser, the light exits from the backlight module. After the liquid crystal panel, the image we want can be shown. Wth the progress of the technology, the requirements of the people to the display quality has become higher and higher. The high color gamut is a hot topic in the related field.

In the present market, a popular technology is to utilize the quantum dot to improve the backlight color gamut. The quantum dot is quasi-zero-dimensional nano material, and constructed by a small amount of atoms; the diameters are generally between 1-10 nm. Because the electrons and holes are in quantum confinement, and the continuous energy band structure becomes the discrete energy level structure with molecule property, which can irradiate fluorescent light after being excited and then can change the color gamut of the coming light.

In prior arts, a common backlight module utilizes the quantum tube to be installed between the lamp sources and the light guide plate to improve the color gamut of the liquid crystal display. However, the two ends of the quantum tube must have the failure edges. In general, the failure edges are inserted in the flue frame of the backlight module. Such longer invalid area makes the increase of the side frame width of the backlight module and is disadvantageous for narrow frame design.

SUMMARY OF THE INVENTION

An objective of the present invention is to provide a backlight module to reduce the side frame width of the backlight module and raise the backlight color gamut.

The present invention further provides a display device.

The present invention provides a backlight module, comprising a glue frame, a backlight source, a light guide plate, a quantum tube and an optical thin film, and the light guide plate comprises an incident surface and an illuminating surface, and the backlight source comprises a substrate and a plurality of lamp sources on the substrate aligned in a straight line, and the quantum tube comprises a mainbody and two bending sections at two ends of the mainbody, and the optical thin film is installed on the illuminating surface, and the glue frame is arranged to surround the light guide plate and periphery of the optical thin film, and the quantum tube is installed on the substrate and arranged to be parallel with the plurality of lamp sources, and the lamp sources are located between the glue frame and the light guide plate, and the mainbody is located between the lamp sources and the incident surface, and bending sections at the two ends of the mainbody are located at outer sides of the lamp sources at two ends of the plurality of the lamp sources.

A length of the mainbody and a total length of the plurality of lamp sources which are sequentially aligned are the same.

The two bending sections are formed by bending the two ends of the mainbody toward the same direction.

The quantum tube and the surface of the substrate provided with the lamp sources are fixed with a double-side tape.

The glue frame comprises two opposite side frames, and two ends of the substrate support surfaces of the side frames, and edges of the substrate is fixed with the side frames by a double-side tape.

The glue frame comprises two opposite side frames, and two ends of the substrate are inserting into the side frames and fixed with the side frames.

The backlight module further comprises a reflective plate, and the reflective plate is installed at one side of the glue frame, and the light guide plate is located on the reflective plate.

The two ends of the substrate are provided with holding parts opposite to the quantum tubes, and parts of the mainbody close to the bending sections are hold inside the holding parts.

The present invention provides a display device, comprising a backlight module and a display panel, wherein the backlight module comprises a glue frame, a backlight source, a light guide plate, a quantum tube and an optical thin film, and the light guide plate comprises an incident surface and an illuminating surface, and the backlight source comprises a substrate and a plurality of lamp sources on the substrate aligned in a straight line, and the quantum tube comprises a mainbody and two bending sections formed by bending two ends of the mainbody, and the quantum tube is installed on the substrate and arranged to be parallel with the plurality of lamp sources, and the optical thin film is installed on the illuminating surface, and the glue frame is arranged to surround the light guide plate and periphery of the optical thin film, and the lamp sources are located between the glue frame and the light guide plate, and the mainbody is located between the lamp sources and the incident surface, and bending sections at the two ends of the mainbody are located at outer sides of the lamp sources at two ends of the plurality of the lamp sources, and the display panel covers one side of the glue frame provided with the optical thin film.

The two ends of the substrate are provided with holding parts opposite to the quantum tubes, and parts of the mainbody close to the bending sections are hold inside the holding parts.

The backlight module of the present invention utilizes the quantum tube to be located between the lamp sources and the incident surface. The part of the quantum tube which might fail due to the air and the environment is set at the bending sections for being away from the incident surface, and thus the failure issue of the backlight module edges can be prevented. Meanwhile, the bending sections are at the edges of the lamp source and do not occupy the additional length and space to prevent the increase of the glue frame width for achieving the narrow frame arrangement.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

For better explaining the technical solution and the effect of the present invention, the present invention will be further described in detail with the accompanying drawings in the specific embodiments.

Figure 1:
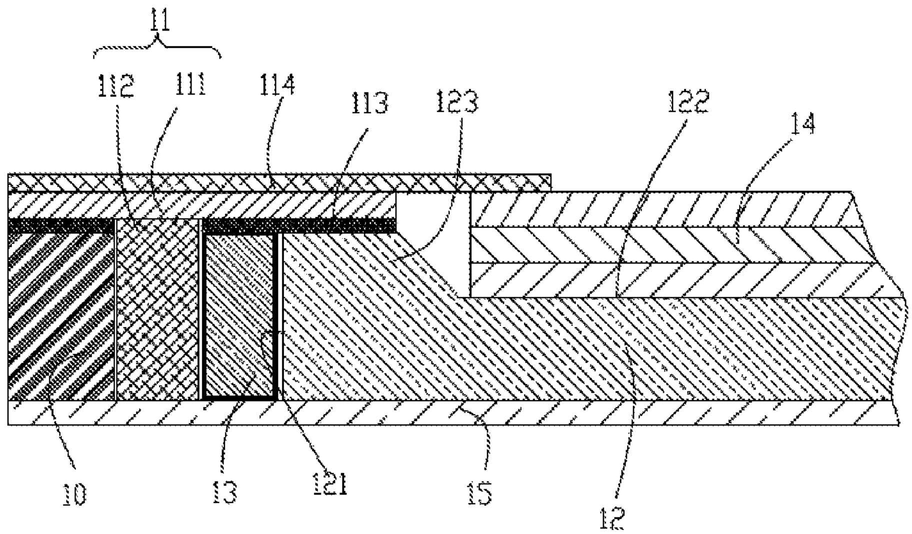
FIG. 1 is a sectional diagram of backlight module according to the preferred embodiment of the present invention.
Figure 2:
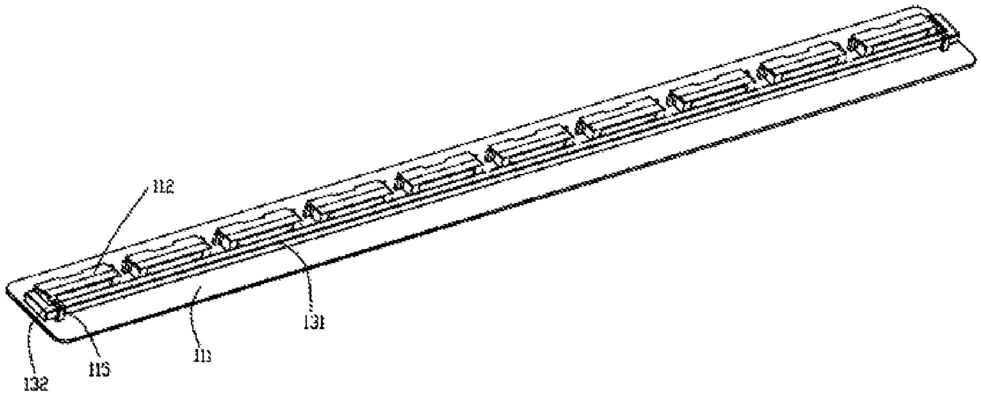
FIG. 2 is a structural diagram of quantum tube of the backlight module shown in FIG. 1 installed at the backlight source.

Please refer to FIG. 1 and FIG. 2. The present invention provides a backlight module and a display device having the backlight module. The display device further comprises a display panel covering on the backlight module which is fixed with a double-side tape 114. In this embodiment, the backlight module comprises a glue frame 10, a backlight source 11, a light guide plate 12, a quantum tube 13 and an optical thin film 14. The light guide plate 12 comprises an incident surface 121 and an illuminating surface 122, and the backlight source 11 comprises a substrate 111 and a plurality of lamp sources 112 on the substrate 111 aligned in a straight line, and the quantum tube 13 comprises a mainbody 131 and two bending sections 132 formed by bending two ends of the mainbody 131, and the optical thin film 14 is installed on the illuminating surface 122, and the glue frame 10 is arranged to surround the light guide plate 12 and periphery of the optical thin film 14, and the quantum tube 13 is installed on the substrate 111 and arranged to be parallel with the plurality of lamp sources 112, and the lamp sources 112 are located between the glue frame 10 and the light guide plate 12, and the mainbody 131 is located between the lamp sources 112 and the incident surface 121, and bending sections 132 at the two ends of the mainbody 131 are located at outer sides of the lamp sources 112 at two ends of the plurality of the lamp sources 112.

Figure 3:
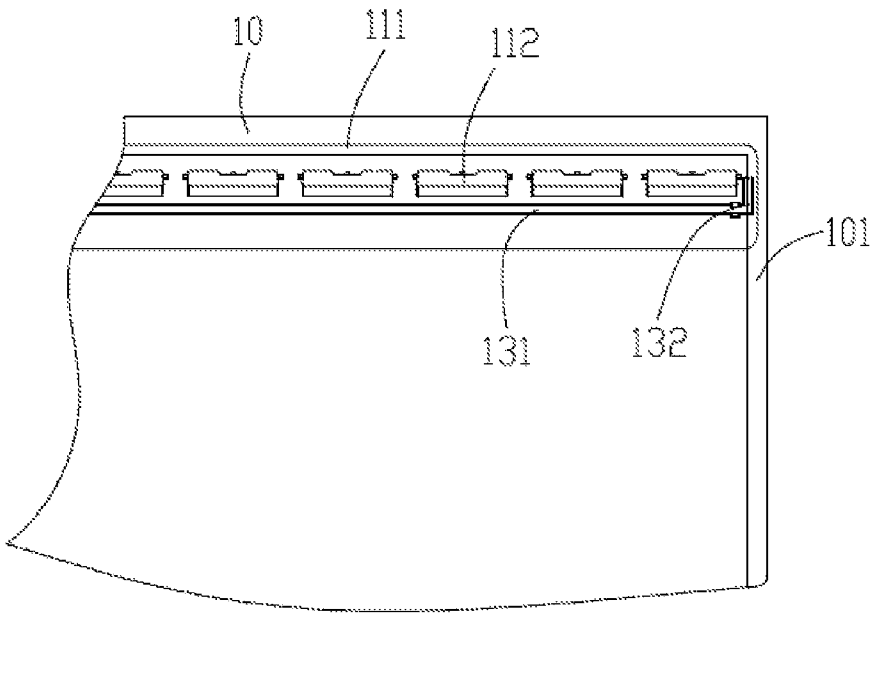
FIG. 3 is a plane diagram of the backlight module in FIG. 1.

Please refer to FIG. 3. In this embodiment, the glue frame 10 is a rectangular frame structure, comprising two opposite side frames 101 and lateral frames (not shown) connecting the two side frames 101. The side frames 101 and the lateral frames surround to form an accommodation space for accommodating the backlight source 11, the light guide plate 12, the quantum tube 13 and the optical thin film 14. The backlight module further comprises a reflective plate 15. The reflective plate 15 is installed at one side of the glue frame 10, and the light guide plate 12 is located on the reflective plate 15. Specifically, the reflective plate 15 is employed to be a base plate of the glue frame 10, and to form a rectangular slot structure with the glue frame 10 for supporting the light guide plate 12 and accommodating the backlight source 11 and the quantum tube 13. Part of the light of the lamp sources 112 which does not enter the light guide plate or leaks from the light guide plate 12 is reflected by the reflective plate 15 to return back into the light guide plate 12 for fully utilizing the light source.

The light guide plate 12 is a rectangular plate body which uniforms the light of the lamp sources 112 and then outgoes the illuminating surface. The incident surface 121 is connected with the illuminating surface 122. The incident surface 121 is a lateral surface of the light guide plate 112. A protruding part 123 is provided at the edges of the illuminating surface. The optical thin film 14 is a rectangular plate body which overlaps on the illuminating surface 122, and the protruding part 123 surrounds the optical thin film 14. The substrate 111 is an Aluminum substrate to provide the electrical power for the lam sources 112. The lamp sources 112 are LED lamps, and the plurality of lamp sources 112 are aligned in a straight line on one surface of the substrate 111.

The quantum tube 13 is a glass tube which the section is a rectangular. The quantum dots in the quantum tube 13 are not all the same but uniformly distributed. The sizes of the most or small portion of the quantum dots are the same. The quantum tube 13 is formed by cutting a longer quantum tube material, and the free end part of the bending section 132 is the cut end. The bending sections 132 are formed by bending the two ends of the mainbody 131 toward the same direction. In this embodiment, the bending section 132 and the mainbody 131 are arranged to form a right angle. The mainbody 131 is parallel with the straight where the lamp sources 112 are, and the bending sections 132 are located at outer sides of the lamp sources 112 at two ends of the plurality of the lamp sources 112, i.e. at the outer positions of the lamp sources 112 which are at the most outer sides. After the light of the lamp sources 112 enters the mainbody 131 of the quantum tube 13 through the incident surface 121, as entering the incident surface 121, the light guide plate 12 uniforms the light and make the light exit from the illuminating surface 122. The quantum tube 13 changes the color gamut of the coming light and raise the backlight module color gamut.

Furthermore, a length of the mainbody 131 and a total length of the plurality of lamp sources 112 which are sequentially aligned are the same for ensuring that the mainbody 131 and the lamp sources 112 are fully corresponding with each other. Thus, it can be ensured that the light of the lamp sources 112 completely enters the mainbody 131 after entering the incident surface 121. Because the free end part of the bending section 132 is the cut end, and the cute end of the quantum tube can be easily influenced by the external conditions, such as water and oxygen, and failure might happen. Therefore, the free ends of the bending sections 132 are failure parts and the bending sections 132 are set to be away from the lamp sources without influencing the high color gamut of the light entering the incident surface 121 and the high color gamut light of the light guide plate can be ensured; meanwhile, the bending sections 132 are positioned at the lateral part of the lamp sources 112 in the substrate 111, and do not extend out of the substrate 111. The length and the space can be saved to prevent increasing the side frame width of the backlight module. In this embodiment, the quantum tube 13 is formed by mold injection.

Furthermore, the quantum tube 13 and the surface of the substrate 111 provided with the lam sources 112 are fixed with a double-side tape 113. The two ends of the substrate 111 are provided with holding parts 115 opposite to the quantum tubes 13, and parts of the mainbody 131 close to the bending sections 132 are hold inside the holding parts 115. Specifically, the mainbody 131 and the bending sections 132 are toward the same lateral surface and fixed with the substrate 111 with the double-side tape 113. The holding part 115 is a structure, such as an inserting slot, a clamping jaw or a retaining ring, which can fix the quantum tube.

Furthermore, two ends of the substrate 111 support surfaces of the side frames 101, and edges of the substrate 111 is fixed with the side frames 101 by a double-side tape. In this embodiment, the two ends of the substrate 111 are positioned on the surface of the side frames 101. In other embodiments, the two ends of the substrate 111 are inserting into the side frames 101 and fixed with the side frames 101. In other words, the ends of the substrate 111 are inserting inside the side frames 101 from the inner side of the side frames 101. Such structure can save the width of the glue frame and the thickness of the backlight module.

The display device of the present invention is an electronic device, such as a mobile display screen or a display.

The backlight module of the present invention utilizes the quantum tube 13 to be located between the lamp sources and the incident surface. The part of the quantum tube 13 which might fail due to the air and the environment is set at the bending sections 132 for being away from the incident surface 121, and thus the failure issue of the backlight module edges can be prevented. Meanwhile, the bending sections 132 are at the edges of the lamp source 112 and do not occupy the additional length and space to prevent the increase of the glue frame width for achieving the narrow frame arrangement. The display device of the present invention utilizes the backlight module to prevent the small edge problem and is convenient for narrow frame design.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A backlight module, wherein the backlight module comprises a glue frame, a backlight source, a light guide plate, a quantum tube and an optical thin film, and the light guide plate comprises an incident surface and an illuminating surface, and the backlight source comprises a substrate and a plurality of lamp sources on the substrate aligned in a straight line, and the quantum tube comprises a mainbody and two bending sections at two ends of the mainbody, and the optical thin film is installed on the illuminating surface, and the glue frame is arranged to surround the light guide plate and periphery of the optical thin film, and the quantum tube is installed on the substrate and arranged to be parallel with the plurality of lamp sources, and the lamp sources are located between the glue frame and the light guide plate, and the mainbody is located between the lamp sources and the incident surface, and the two bending sections at the two ends of the mainbody are located at outer sides of the lamp sources at two ends of the plurality of the lamp sources;

wherein the two bending sections of the quantum tube are respectively extending from the two ends of the mainbody of the quantum tube such that each of the two bending sections has a distal free end that is distant from the end of the mainbody of the quantum tube from which the bending section extends and wherein the two bending sections of the quantum tube are opposite to and spaced from each other to define therebetween a space such that the plurality of the lamp sources of the backlight source are located in the space defined between the two bending sections of the quantum tube; and wherein the quantum tube comprises a glass tube having a predetermined cross-sectional shape and quantum dots filled in the glass tube, the two bending sections of the quantum tube comprising bending of the glass tube in each of two opposite ends of the glass tube such that the two bending sections of the quantum tube have a cross-section that has a shape identical to the predetermined cross-sectional shape, wherein the quantum tube has a U-shaped configuration having a base section and two limb sections extending from the base section, the base section of the U-shaped configuration comprising the mainbody of the quantum tube, the two limb sections of the U-shaped configuration respectively comprising the two bending sections, the plurality of the lamp sources of the backlight source being partly enclosed by the U-shaped configuration.

2. The backlight module according to claim 1, wherein a length of the mainbody and a total length of the plurality of lamp sources which are sequentially aligned are the same.

3. The backlight module according to claim 2, wherein the quantum tube and the surface of the substrate provided with the lamp sources are fixed with a double-side tape.

4. The backlight module according to claim 3, wherein the glue frame comprises two opposite side frames, and two ends of the substrate support surfaces of the side frames, and edges of the substrate is fixed with the side frames by a double-side tape.

5. The backlight module according to claim 4, wherein the backlight module further comprises a reflective plate, and the reflective plate is installed at one side of the glue frame, and the light guide plate is located on the reflective plate.

6. The backlight module according to claim 5, wherein the two ends of the substrate are provided with holding parts opposite to the quantum tube, and parts of the mainbody close to the bending sections are held inside the holding parts.

7. The backlight module according to claim 3, wherein the glue frame comprises two opposite side frames, and two ends of the substrate are inserting into the side frames and fixed with the side frames.

8. The backlight module according to claim 7, wherein the backlight module further comprises a reflective plate, and the reflective plate is installed at one side of the glue frame, and the light guide plate is located on the reflective plate.

9. The backlight module according to claim 8, wherein the two ends of the substrate are provided with holding parts opposite to the quantum tube, and parts of the mainbody close to the bending sections are held inside the holding parts.

10. The backlight module according to claim 1, wherein the two bending sections are formed by bending the two ends of the mainbody toward the same direction.

11. A display device, comprising a backlight module and a display panel, wherein the backlight module comprises a glue frame, a backlight source, a light guide plate, a quantum tube and an optical thin film, and the light guide plate comprises an incident surface and an illuminating surface, and the backlight source comprises a substrate and a plurality of lamp sources on the substrate aligned in a straight line, and the quantum tube comprises a mainbody and two bending sections at two ends of the mainbody, and the optical thin film is installed on the illuminating surface, and the glue frame is arranged to surround the light guide plate and periphery of the optical thin film, and the quantum tube is installed on the substrate and arranged to be parallel with the plurality of lamp sources, and the lamp sources are located between the glue frame and the light guide plate, and the mainbody is located between the lamp sources and the incident surface, and the two bending sections at the two ends of the mainbody are located at outer sides of the lamp sources at two ends of the plurality of the lamp sources, and the display panel covers one side of the glue frame provided with the optical thin film;

wherein the two bending sections of the quantum tube are respectively extending from the two ends of the mainbody of the quantum tube such that each of the two bending sections has a distal free end that is distant from the end of the mainbody of the quantum tube from which the bending section extends and wherein the two bending sections of the quantum tube are opposite to and spaced from each other to define therebetween a space such that the plurality of the lamp sources of the backlight source are located in the space defined between the two bending sections of the quantum tube; and wherein the quantum tube comprises a glass tube having a predetermined cross-sectional shape and quantum dots filled in the glass tube, the two bending sections of the quantum tube comprising bending of the glass tube in each of two opposite ends of the glass tube such that the two bending sections of the quantum tube have a cross-section that has a shape identical to the predetermined cross-sectional shape, wherein the quantum tube has a U-shaped configuration having a base section and two limb sections extending from the base section, the base section of the U-shaped configuration comprising the mainbody of the quantum tube, the two limb sections of the U-shaped configuration respectively comprising the two bending sections, the plurality of the lamp sources of the backlight source being partly enclosed by the U-shaped configuration.

12. The display device according to claim 11, wherein a length of the mainbody and a total length of the plurality of lamp sources which are sequentially aligned are the same.

13. The display device according to claim 12, wherein the quantum tube and the surface of the substrate provided with the lamp sources are fixed with a double-side tape.

14. The display device according to claim 13, wherein the glue frame comprises two opposite side frames, and two ends of the substrate support surfaces of the side frames, and edges of the substrate is fixed with the side frames by a double-side tape.

15. The display device according to claim 14, wherein the glue frame comprises two opposite side frames, and two ends of the substrate are inserting into the side frames and fixed with the side frames.

16. The display device according to claim 15, wherein the backlight module further comprises a reflective plate, and the reflective plate is installed at one side of the glue frame, and the light guide plate is located on the reflective plate.

17. The display device according to claim 16, wherein the two ends of the substrate are provided with holding parts opposite to the quantum tube, and parts of the mainbody close to the bending sections are held inside the holding parts.

18. The display device according to claim 11, wherein the two bending sections are formed by bending the two ends of the mainbody toward the same direction.

* * * * *